Patented May 8, 1951

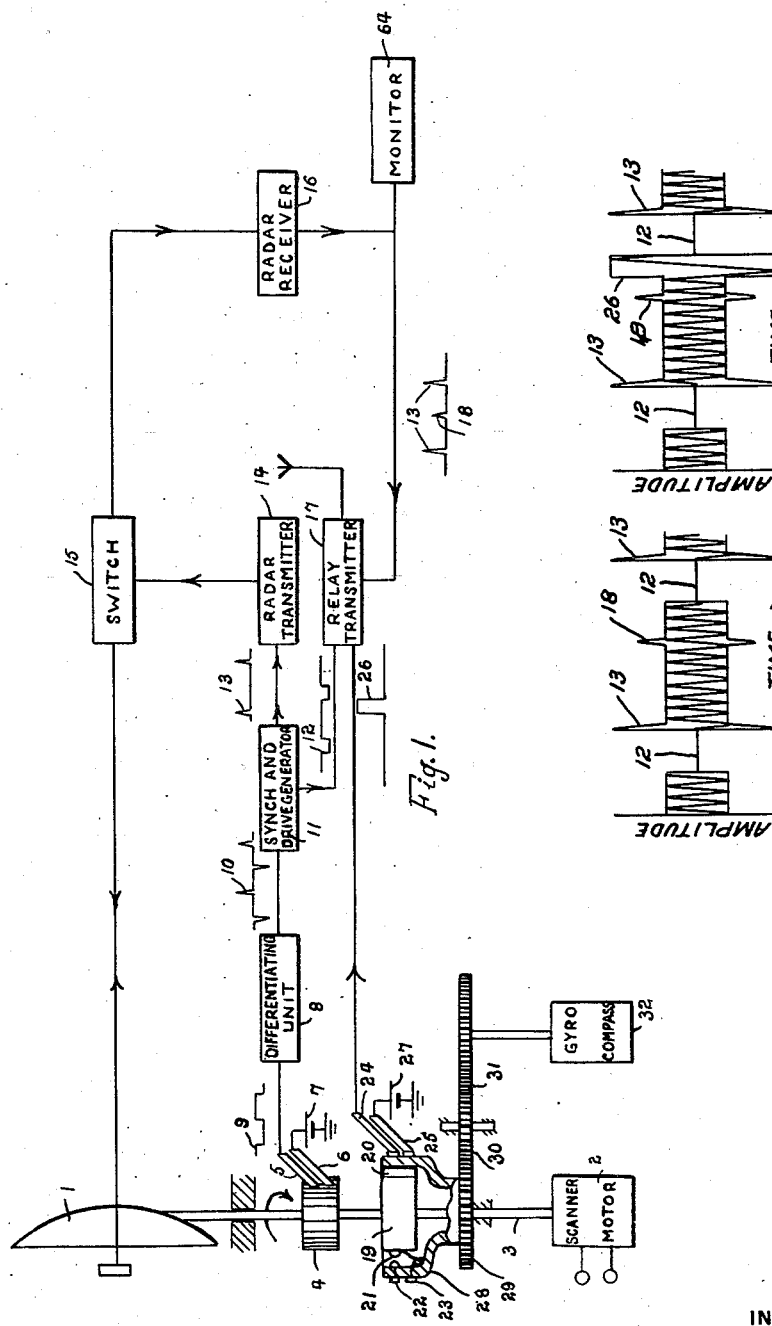

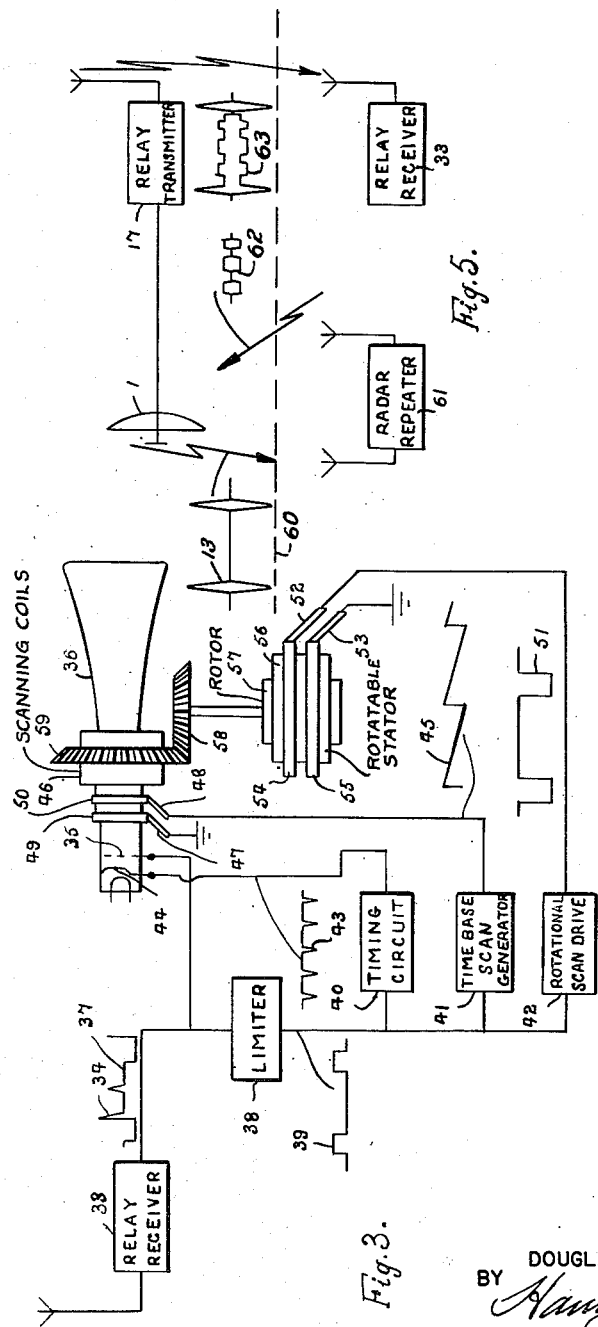

2,552,172

UNITED STATES PATENT OFFICE 2,552,172

SYSTEM FOR RELAYING INFORMATION INDICATIVE OF THE POSITION OF AN OBJECT

Douglas Owen Hawes, Whetstone, London, England, assignor to The General Electric Company Limited, London, England Application February 9, 1945, Serial No. 576,982
In Great Britain November 19, 1943

Section 1, Public Law 690, August 8, 1946
Patent expires November 19, 1963

3 Claims. (Cl. 343—6)

This invention relates to position-indicating systems of the type wherein a first station comprising a scanner which emits radar pulses successively in each of a plurality of directions and a radar receiver for receiving echoes of these pulses from a target, is associated with a second station, distant from the first station, to which information about the target obtained at the first station has to be communicated. For this purpose what may be called a relay transmitter and a relay receiver are provided at the first and second stations respectively for the conveyance of the required information. The term echoes is intended to include beacon or like radar signals generated at the target upon arrival thereat of the radar pulses emitted by the first station.

The first station may for example be borne on an aircraft and the second station may be on land or in a ship, for example an aircraft carrier; or the first station may be in a small boat radio-controlled from a large ship. Both the first and the second stations may be on land, for example the first station may be at an advanced observation post and the second station may be at a headquarters.

The invention also relates to apparatus adapted to form part of systems of the type set forth.

The information about the target is usually obtained in the form of a "picture" on a cathode-ray-tube screen. It has been proposed to communicate it to the second station by using a television transmitter to scan the screen and receiving the television signals at the second station. The proposal of this invention is broadly to transmit, instead of the picture on the screen, signals which determine that picture and from which a similar picture may be reproduced at the second station.

Thus suppose that the apparatus at the first station is a normal air-surface-vessel radar apparatus with a circular or helical scanner giving P. P. I. on the screen at the first station. The radar transmitter of the said apparatus will then emit N pulses per scan in N different directions and the information about the target will be contained in information as to which of the N pulses (say the $m$th) produces an echo, and the interval between the emission of the $m$th pulse and the arrival of the echo. This information can be conveyed to the second station, if the speed of rotation of the scanner, and the time interval between the instant at which each scan starts and the instant when an echo arrives are conveyed to that station. For then that station will know when a pulse is emitted in a given direction, and consequently the time when the pulse that produced the echo was emitted; the interval between the emission of this pulse and the receipt of the echo will give the range of the target. A P. P. I. at the second station can then be set up, which will reproduce the indication of the P. P. I. at the first station.

This information can be transmitted by means of synchronising signals similar to those customary in television and by "picture" signals, varying in amplitude, similar to the picture signals of television.

According to the present invention there is provided relay transmission equipment adapted for use in a position-indicating system of the type set forth, comprising a relay transmitter for transmitting a synchronising signal indicative both of the speed of said scanner and of the instants at which said radar pulses are emitted and an echo signal indicative of the instants at which echoes or other returned pulses are received at said radar receiver station. The said signals are preferably transmitted by radio and preferably a single carrier is used having a frequency different from that employed for the radar pulses.

It is to be observed that at the first station the points in the scan at which pulses are emitted in a given direction will have to be fixed even if the speed of the scan varies. That is to say the "repetition frequency" will have to be locked to the scanning speed. Further since the pulses are likely to have components of a frequency as high as 1 mc./s., the carrier will have to be capable of being modulated at that frequency.

The information discussed hitherto will enable the second station to determine the direction of the target relative to some datum direction in the first station. If the first station is mobile, it will generally be necessary that the second station should be informed also of the absolute (e. g. compass) bearing of this datum. This can be achieved by transmitting a characteristic signal when the said scanner is in position to transmit in a predetermined direction.

The position-indicating system according to the present invention further includes relay receiving equipment adapted to receive signals transmitted by the relay transmission equipment. This relay receiving equipment includes a cathode ray tube device, means for deriving from said synchronising signal and applying to the cathode ray tube device a time base signal, such for example as a signal of saw tooth wave form, serving to produce deflections of the cathode rays in a range indicating co-ordinate, for example radially, and scanning signals serving to produce deflections of the cathode rays in a second co-ordinate, for example circumferentially, indicative of the direction of emission of radar pulses at the radar transmitter. The relay receiving equipment also includes means for applying to the cathode ray tube device to modulate the intensity of the cathode rays, or to produce deflections of the cathode rays in a suitable direction, an echo signal indicative of the instants of arrival of echoes or other returned pulses of said radar receiver and said synchronising signal, or a derivative thereof indicative of the instants of emission of radar pulses from said scanner.

It is to be understood that the term cathode ray tube device is intended to include a single cathode ray tube in which all the required information is presented on one screen, also a plurality of cathode ray tubes each presenting a part of the required information, and also one or more cathode ray tubes each having a plurality of distinct beams of cathode rays each such beam being affected differently from the remainder in respect of its deflection or brightness or both.

Other features of the invention will be apparent from the following description and from the appended claims.

The invention will be described by way of example with reference to the accompanying drawings in which:

Fig. 1 is a block diagram illustrating a preferred arrangement of a first station including a relay transmitter, Fig. 2 shows a signal waveform such as may be transmitted by the relay transmitter of Fig. 1, Fig. 3 is a block diagram illustrating a preferred arrangement of a second station including a relay receiver, Fig. 4 shows an alternative waveform to that of Fig. 2, and Fig. 5 is a block diagram illustrating a complete system including a relay transmitter and a relay receiver and embodying an addition to what is shown in Figs. 1 and 3.

Referring to Fig. 1, a scanner 1 is a highly directional antenna, in this example a paraboloid. It is rotated by means of a motor 2 through a shaft 3. On the shaft is mounted a rotary switch 4 comprising a drum having alternate conducting and insulating segments and two brushes 5 and 6. As the drum rotates pulses are applied from a battery 7 to a differentiating unit 8. The waveform of these pulses is indicated at 9 and it will be understood that they may be generated in any other suitable manner so long as their frequency and phase bears a fixed relation to the rotation of the scanner 1.

The differentiating unit produces a wave form such as is shown at 10 and this is applied to a "synch and drive generator" 11 which generates a synchronising signal 12 to enable synchronism with the rotation of the scanner 1 to be obtained at the relay receiver, and driving pulses 13 for triggering a radar transmitter 14. The "synch and drive generator" 11 comprises limiters which separate the positive from the negative pulses of the waveform 10. The driving pulses 13 are derived in unit 11 from the positive pulses of the differentiating signal 10 by any well-known limiting action such as that afforded by a diode limiter or by a conventional peak detector. An example of such a limiter is represented by the circuit of the peak detector tube $V_{T_3}$ represented in the Fig. 1 circuit appearing on page 108 of the article entitled "A Phase Curve Tracer for Television" by Bernard D. Loughlin and appearing in the March 1941 issue of the Proceedings of the I. R. E.

The output pulses 12 of the unit 11 of the present invention are derived therein from the negative pulses of the differentiated signal 10 by a suitable limiter such as a diode limiter poled to translate only pulses of negative polarity. The translated negative-polarity pulses may then be utilized to control known apparatus such as a multivibrator of the type described and represented on pages 511 and 512 of the text entitled "Radio Engineers' Handbook" by Frederick E. Terman, published by the McGraw-Hill Book Company, Inc., in 1943. The multivibrator is effective to produce in its output circuit the substantially rectangular pulses 12 for application to the relay transmitter 17.

The drive pulses 13 applied to the radar transmitter 14 control in known manner the generation of radar pulses which are fed to the scanner 1. Echoes or other signals returned by a target are picked up by the scanner and pass through a switch device 15 to a radar receiver 16. The switch device 15 may be of known type, for instance a gas filled discharge tube, for preventing transmitter power passing into the receiver 16 and received power passing into the transmitter 14 whilst permitting transmitter power to pass to the scanner 1 and received power to pass to the receiver 16. The radar receiver also picks up a part of the transmitted signal 13 from the transmitter 14.

The synchronizing signal 12 is fed to a relay transmitter 17 together with the transmitted pulses 13 and received pulses 18 from the radar receiver 16. These signals are applied in known manner to modulate in amplitude a radio frequency carrier of a frequency different from that employed by the radar transmitter 14. The waveform of the pulse-modulated radio-frequency signal of the relay transmitter 17 is shown in Fig. 2 wherein the envelope portions corresponding to the different components of the modulation are given the same references as in Fig. 1. The last-mentioned radio-frequency signal has its greatest amplitude when a driving pulse is applied to the radar transmitter 14 and has a zero amplitude during the interval in which a synchronizing signal is produced. The transmitter 17 is made capable of wide band modulation and may be of a design such as is used for television transmission.

It will be appreciated that in the radar system described, unlike the normal radar systems, a fixed number of pulses 13 are transmitted per rotation of the scanner 1, instead of a fixed number of pulses 13 per second irrespective of the scanner speed.

In order that the phase of the rotation of the scanner 1 may be reproduceable at a relay receiver, a characteristic and therefore easily identifiable signal may be transmitted from the relay transmitter 17 when the scanner is in a predetermined position, for example facing north. This may be effected in the following way. Referring to Fig. 1, on the shaft 3 there is fixedly mounted a cam 19 having a projecting portion 20 which, once every revolution of the scanner 1, closes switch contacts 21, thereby connecting together two slip rings 22 and 23 which are engaged by brushes 24 and 25 respectively and causing a pulse 26 from a battery 27 to be passed to the relay transmitter 17. One of the contacts 21 and the slip rings 22 and 23 are mounted on a member 28 which is rotatably mounted on the shaft 3 and is coupled by gearing 29, 30 and 31 to a gyro compass 32 whereby the member 29 is caused to maintain a constant orientation relatively to north and it can be arranged that a pulse 26 is emitted each time the scanner is facing north. The wave form of the complex modulation of the transmitter 17 when the scanner 1 is facing the predetermined direction at which the phase-identifying pulse is to be transmitted is then as shown in Fig. 4.

If desired there may be provided a monitor 64 which enables the signals received by the radar receiver 16 to be observed. The presentation in the monitor may be of any suitable type such for example as a P. P. I. in which range is plotted radially from the centre of a cathode ray tube and bearing is represented circumferentially.

Referring now to Fig. 3, a relay receiver 33 receives signals transmitted by the relay transmitter 17 of Fig. 1 and demodulates them to produce a wave form 34 corresponding to onehalf the envelope represented in Fig. 2 or Fig. 4. The receiver 33 is of the wide band type and may be of a design such as is used for television reception. The receiver 33 is preferably provided with A. V. C. in order that variations in signal strength such as may be expected from a remote, and often a moving, transmitter can be compensated for. For this purpose the transmitted signal should be arranged to reach the maximum carrier amplitude once during each synchronising signal period. It may for instance be arranged that the peaks of the transmitted pulses 13 (Fig. 2) always correspond to the maximum carrier amplitude. Alternatively the wave form of Fig. 2 may be inverted and the peak of the synchronising signal 12 may correspond to 100% amplitude whilst the transmitted pulses 13 correspond to a minimum of carrier amplitude.

The wave form 34 is fed directly to the control grid 35 of a cathode ray tube device, in this example a single tube 36 having a single beam of cathode rays, in such a sense that the peaks above the zero line 37 increase the brightness of the spot on the screen of the tube 36, the zero line 37 corresponding to zero brightness. The wave form 34 is also fed to a limiter 38 which, in known manner, passes only the synchronising pulses and inverts these to produce a wave form 39. This signal 39 is fed to three circuit elements namely a timing circuit 40, a time base scan generator 41, and a rotational scan generator 42.

The timing circuit 40 produces in known manner from each synchronising pulse a series of pulses spaced from one another and from the synchronising pulse by equal time intervals. A timing circuit of the general type under consideration may comprise the well-known harmonic generator or frequency multiplier and such a unit is disclosed as a portion of the circuits represented in Figs. 1 and 3 on pages 108 and 109 of the above-identified article of Bernard D. Loughlin. These timing pulses shown at 43 are fed to the cathode 44 of the cathode ray tube 36 in such sense that each pulse brightens the spot on the screen. The spots so produced constitute a range scale.

The time base scan generator 41 utilizes the synchronising pulses to generate in known manner a saw tooth current wave form 45 which is fed to scanning coils 46 of the cathode ray tube 36 through brushes 47 and 48 co-operating with slip rings 49 and 50 respectively. These scanning coils 46 serve to deflect the cathode ray radially from the centre outwards.

The rotational scan drive 42 amplifies the synchronising pulses and feeds the wave form 51 through brushes 52 and 53 and slip rings 54 and 55 to the stator 56 of a synchronous motor, the rotor 57 of which is coupled by gearing 58, 59 to the coils 46 which are mounted for rotation about the axis of the cathode ray tube 36. Assuming that the stator 56 is at rest, the rotor 57 is arranged to rotate the coils 46 once for every rotation of the scanner 1 of Fig. 1. Instead of a synchronous motor there may be used a uniselector mechanism in which an electromagnet is energised by each pulse 51 and an armature associated therewith and with a pawl and ratchet wheel moves the gear 59 and hence the coils 46 through a predetermined angle.

The effect of the rotation of the coils 46 is to produce a circumferential co-ordinate of scanning of the cathode ray. In order that the circumferential movement of the spot on the screen shall be correctly phased with the movement of the scanner 1 of Fig. 1, the wave form of Fig. 4 may be transmitted. The pulse 26 of Fig. 4 appears on the screen of the cathode ray tube 36 as a relatively large bright patch readily distinguishable from the peaks of pulses 13 and 13. By rotating the stator 56 this bright patch may be brought to a desired position on the screen, for instance to the top.

It is of course not essential that the scanner 1 of Fig. 1 should be in continuous rotation in one direction. Thus the scanner may sweep any desired arc in a to and fro motion and the means for moving the coils 46 of Fig. 3 would then be suitably modified to reproduce such to and fro movement in step with that of the scanner 1. Further, it is of course not essential that a P. P. I. type presentation such as has been described, should be provided at the second station. Other types of presentation, for example one in which the transmitted radar pulse and the echo are represented by deflections instead of by increase of brightness. The required indications at the second station may be presented on more than one cathode ray tube for example range on one tube and direction on another.

It may be required to give to the second station of Fig. 3 information to enable the position of the first station to be determined. This may be done in the following manner. Referring to Fig. 5, a scanner 1 is shown associated with a relay transmitter 17. Although only these two parts of a first station are shown, it may be assumed that the arrangement above the dotted line 60 corresponds to that of Fig. 1. Similarly it may be assumed that below the dotted line 60 are the parts of a second station such as shown in Fig. 3 although only the relay receiver 33 is shown.

At the second station is provided a receivertransmitter arrangement or radar repeater 61 which on receiving a radar pulse 13 from the scanner 1 generates and emits in known manner a coded signal such as that shown at 62. This repeated signal is coded, for example the wave form is such as to render the signal distinguishable from the other pulses received at the radar receiver at the first station. Any suitable form of coding may be used. The repeated signal 62 is picked up by the scanner 1 and will therefore be transmitted with the other pulses received by the scanner by the relay transmitter 17, as indicated at 63, and received by the relay receiver 33. The time delay in the repeater 61 is fixed and the range of the first station from the second station can therefore be determined by the radial displacement of the coded signal from the centre of the screen of the cathode ray tube at the second station. The bearing of the second station from the first is obtained from the angular position around the screen at which the coded signal appears.

Although certain preferred forms of the invention have been described in some detail, it is to be understood that many variations may be made in its component parts within the scope of the appended claims.

I claim:

1. In a position-indicating system, a system for transmitting position information comprising: a first station including a movable scanner for emitting radio-frequency radar pulses successively in each of a plurality of directions; a second station including a radio receiver-transmitter arrangement for receiving said radar pulses and for generating and transmitting in response thereto reply pulses with a wave form different from that of said radar pulses; a radar receiver at said first station for receiving from a target signals initiated by said radar pulses and for receiving said reply pulses of said second station; and a radio-relay transmitter at said first station for transmitting synchronizing signals, said radio-relay transmitter being so arranged with relation to said scanner that it is operatively controlled by the movement thereof, that said synchronizing pulses generated thereby per unit time are proportional to the speed of said scanner, and that the time of occurrence of said synchronizing pulses is indicative of the instants at which said radar pulses are emitted by said scanner despite any variation in the scanning speed thereof, said radio-relay transmitter also transmitting return signals indicative of the instants at which said signals are received at said radar receiver from said target, and a signal indicative of the instants at which said radar receiver receives said reply pulses from said second station.

2. A transmitting system according to claim 1 including means, operative when said scanner is in a position to transmit said radar pulses in a predetermined direction, for causing said relay transmitter additionally to transmit a direction-indicating signal having characteristics distinguishing it from said synchronizing and return signals.

3. A position-indicating system comprising: a first station including a movable scanner for emitting radio-frequency radar pulses successively in each of a plurality of directions; a second station including a radio receiver-transmitter arrangement for receiving said radar pulses and for generating and transmitting in response thereto reply pulses with a wave form different from that of said radar pulses; a radar receiver at said first station for receiving from a target signals initiated by said radar pulses and for receiving said reply pulses of said second station; and a radio-relay transmitter at said first station for transmitting synchronizing signals, said radio-relay transmitter being so arranged with relation to said scanner that it is operatively controlled by the movement thereof, that said synchronizing pulses generated thereby per unit time are proportional to the speed of said scanner, and that the time of occurrence of said synchronizing pulses is indicative of the instants at which said radar pulses are emitted by said scanner despite any variation in the scanning speed thereof, said radio-relay transmitter also transmitting return signals indicative of the instants at which said signals are received at said radar receiver from said target, and a signal indicative of the instants at which said radar receiver receives said reply pulses from said second station; a radio-relay receiver at said second station for receiving from said relay transmitter the signal information transmitted therefrom; and means coupled to said relay receiver for utilizing said received signal information to provide an indication of the position of said target relative to said first station and the position of said second station relative to said first station.

DOUGLAS OWEN HAWES.

REFERENCES CITED

The following references are of record in the file of this patent:

UNITED STATES PATENTS

| Number | Name | Date |
|---|---|---|
| 2,134,716 | Gunn | Nov. 1, 1938 |
| 2,252,083 | Luck | Aug. 12, 1941 |
| 2,293,899 | Hanson | Aug. 25, 1942 |
| 2,403,562 | Smith | July 9, 1946 |
| 2,405,239 | Seeley | Aug. 6, 1946 |
| 2,405,930 | Goldberg et al. | Aug. 13, 1946 |
| 2,412,669 | Bedford | Dec. 17, 1946 |
| 2,412,670 | Epstein | Dec. 17, 1946 |
| 2,415,359 | Loughlin | Feb. 4, 1947 |
| 2,415,981 | Wolff | Feb. 18, 1947 |
| 2,421,747 | Engelhardt | June 10, 1947 |
| 2,422,295 | Eaton | June 17, 1947 |
| 2,422,361 | Miller | June 17, 1947 |

FOREIGN PATENTS

| Number | Country | Date |
|---|---|---|
| 116,666 | Australia | Aug. 30, 1941 |